(12) United States Patent
Chaumonnot et al.

(10) Patent No.: US 7,994,085 B2
(45) Date of Patent: *Aug. 9, 2011

(54) MATERIAL WITH A HIERARCHICAL POROSITY COMPRISING SILICON

(75) Inventors: Alexandra Chaumonnot, Lyons (FR); Aurélie Coupe, Noisiel (FR); Clément Sanchez, Gif-sur-Yvette (FR); Patrick Euzen, Paris (FR); Cédric Boissiere, Paris (FR); David Grosso, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 815 days.

This patent is subject to a terminal disclaimer.

(21) Appl. No.: 11/165,570

(22) Filed: Jun. 24, 2005

(65) Prior Publication Data

US 2006/0030477 A1 Feb. 9, 2006

(30) Foreign Application Priority Data

Jun. 24, 2004 (FR) ...................................... 04 06940

(51) Int. Cl.
*B01J 29/06* (2006.01)
(52) U.S. Cl. ................. 502/63; 502/64; 502/69; 502/70
(58) Field of Classification Search .................... 502/63, 502/64, 69, 70
See application file for complete search history.

(56) References Cited

U.S. PATENT DOCUMENTS

| 4,217,240 | A | 8/1980 | Bergna |
| 5,192,520 | A | 3/1993 | Delprato et al. |
| 6,387,453 | B1 | 5/2002 | Brinker et al. |
| 6,592,764 | B1 | 7/2003 | Stucky et al. |
| 6,866,925 | B1 | 3/2005 | Chane-Ching |
| 2002/0131930 | A1 | 9/2002 | Pinnavaia et al. |
| 2004/0192947 | A1 | 9/2004 | Chane-Ching et al. |
| 2006/0292054 | A1 | 12/2006 | Chaumonnot et al. |

FOREIGN PATENT DOCUMENTS

| FR | 2800300 | 5/2001 |
| WO | WO 9937705 | 7/1999 |

OTHER PUBLICATIONS

Prokesova et al., Preparation of nanosized micr/mesoporous composites via simultaneous synthesis of Beta/MCM-48 phases, Microporous and Mesoporous Materials 64 (2003), pp. 165-174 (no month).*
U.S. Appl. No. 11/889,891 "Mesostructured Material with a High Aluminum Content"; filed Aug. 17, 2007.
Galo J. De A.A. Soler-Illia; Clement Sanchez, Bendeicte Libeau, Joel Patarin: "Chemical Strategies to Design Textured Materials: From Microporous and Mesoporous Oxides to Nanonetworks and Hierarchical Structures" Chem. Rev., vol. 102, Oct. 25, 2002 pp. 4093-4138, XP002308089.
C.J. Brinker, Y.Lu, A. Sellinger, H. Fan: "Evaporation Induced Self-Assembly Nanostructures Made Easy" Advanced Materials, vol. 11, No. 7, 1999, pp. 579-585, XP002308090.
Arne Karlsson, Michael Stoecker, Ralf Schmidt: "Composites of Micro- and Mesoporous Materials: Simultaneous Syntheis of MFI/MCM-41 Like Phases by a Mixed Template Approach" Microporous and Microporous Materials, vol. 27, 1999, pp. 181-192, XP002308091.

* cited by examiner

*Primary Examiner* — Elizabeth D Wood
(74) *Attorney, Agent, or Firm* — Millen, White, Zelano & Branigan, P.C.

(57) ABSTRACT

A material with a hierarchical porosity is described, constituted by at least two spherical elementary particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 20 nm, said spherical elementary particles having a maximum diameter of 10 μm. the matrix based on silicon oxide may contain aluminium. The preparation of said material is also described.

17 Claims, 2 Drawing Sheets

MATERIAL WITH A HIERARCHICAL POROSITY COMPRISING SILICON

The present invention relates to the field of materials comprising silicon, in particular metallosilicate materials and more precisely aluminosilicate materials having a hierarchical porosity in the field of microporosity and mesoporosity regions. It also relates to the preparation of said materials which are obtained using the "aerosol" synthesis technique.

PRIOR ART

Novel synthesis strategies for producing materials with a porosity which is well defined over a very broad range, from microporous materials to macroporous materials via materials with a hierarchical porosity, i.e. with pores of various sizes, have been widely developed in the scientific community since the middle of the 1990s (G J de A A Soler-Illia, C Sanchez, B Lebeau, J Patarin, Chem Rev 2002, 102, 4093). Materials are obtained in which the pore size is controlled. In particular, the development of syntheses using "mild chemistry" methods has led to the production of mesostructured materials at low temperature by the co-existence in aqueous solution or in polar solvents of inorganic precursors with templates, generally ionic or neutral molecular or supramolecular surfactants. Controlling the electrostatic interactions or hydrogen bonding between the inorganic precursors and the template jointly with hydrolysis/condensation reactions of the inorganic precursor has led to a cooperative organization of organic and inorganic phases generating micellar aggregates of surfactants of controlled uniform size in an inorganic matrix. This cooperative self-organization phenomenon governed, inter alia, by the concentration of the template, may be induced by progressive evaporation of a solution of reagents in which the concentration of the template is lower than the critical micellar concentration, which leads either to the formation of mesostructured films in the case of deposition onto a substrate (dip-coating) or to the formation of a mesostructured powder when the solution is atomized (aerosol technique). As an example, U.S. Pat. No. 6,387,453 discloses the formation of mesostructured organic-inorganic hybrid films using the dip coating technique, the same authors having also used the aerosol technique to produce purely silicic mesostructured materials (C J Brinker, Y Lu, A Sellinger, H Fan, Adv Mater 1999, 11, 7). The pores are then released by eliminating the surfactant, this being carried out conventionally by chemical extraction or by heat treatment.

Several classes of mesostructured materials have been developed using the different natures of the inorganic precursors and the template employed as well as the operating conditions imposed. As an example, the M41S class initially developed by Mobil (J S Beck, J C Vartuli, W J Roth, M E Leonowicz, C T Kresge, K D Schmitt, C T-W Chu, D H Olson, E W Sheppard, S B McCullen, J B Higgins, J L Schlenker, J Am Chem Soc, 1992, 114, 27, 10834) constituted by mesoporous materials obtained using ionic surfactants such as quaternary ammonium salts, having a generally hexagonal, cubic or lamellar structure, pores of uniform size in the range 1.5 to 10 nm and amorphous walls with a thickness of the order of 1 to 2 mm, has been widely studied. Subsequently, to increase the hydrothermal stability while developing the acid-basic properties relative to said materials, incorporation of elemental aluminium into the amorphous silicic framework by direct synthesis or by post-synthesis processes have been particularly regarded, the aluminosilicate materials obtained having a Si/Al molar ratio in the range 1 to 1000 (S Kawi, S C Chen, Stud Surf Sci Catal 2000, 129, 227; S Kawi, S C Shen, Stud Surf Sci Catal 2000, 129, 219; R Mokaya, W Jones, Chem Commun 1997, 2185). The hydrothermal stability and acid-basic properties developed by such aluminosilicates, however, did not allow them to be used on an industrial scale in refining processes or in petrochemistry, which has steadily led to the use of novel templates such as block copolymer type amphiphilic macromolecules, these latter producing mesostructured materials having a generally hexagonal, cubic or lamellar structure, with uniform sized pores in the range 4 to 50 nm and amorphous walls with a thickness in the range 3 to 7 nm. Depending on the structure and desired degree of organization for the final mesostructured material, the synthesis methods employed could take place in an acidic medium (pH approx 1) (International patent application WO-A-99/37705) or in a neutral medium (WO-A-96/39357), the nature of the template used also playing a major role. The mesostructured aluminosilicate materials obtained have enhanced hydrothermal stability properties compared with their homologues synthesized using other templates, their acid-basic properties remaining very similar ($1<Si/Al<1000$) (D Zaho, J Feng, Q Huo, N Melosh, G H Fredrickson, B F Chmelke, G D Stucky, Science, 1998, 279, 548; Y-H Yue, A Gédéon, J-L Bonardet, J B d'Espinose, N Melosh, J Fraissard, Stud Surf Sci Catal 2000, 129, 209).

Despite the great deal of work explained above aimed at improving the hydrothermal stability and acid-basic properties of mesostructured aluminosilicate materials, they have not yet been developed on an industrial scale, principally because their catalytic behaviour linked to their acidity is closer to an amorphous aluminosilicate than to a crystalline zeolitic aluminosilicate. A great deal of work has thus been undertaken to produce aluminosilicate materials having the advantages of both an organized mesoporous structure and those of a micro crystalline framework. Several synthesis techniques to produce mixed materials or mesostructured/zeolite composites have thus been recorded in the open literature. A first synthesis technique consists in a first step of synthesizing a mesostructured aluminosilicate material using the conventional methods explained above then, in a second step, impregnating said material with a template normally used for synthesizing zeolitic materials. A suitable hydrothermal treatment results in zeolitization of the amorphous walls of the starting mesostructured aluminosilicate (U.S. Pat. No. 6,669,924). A second synthesis technique consists of bringing a colloidal solution of zeolite seeds into the presence of a template normally used to create a mesostructuration of the final material. Production of an inorganic matrix with an organized meosporosity and growth in that matrix of zeolite seeds to obtain a mesostructured aluminosilicate material having crystalline walls are simultaneous (Z Zhang, Y Han, F Xiao, S Qiu, L Zhu, R Wang, Y Yu, Z Zhang, B Zou, Y Wang, H Sun, D Zhao, Y Wei, J Am Chem. Soc, 2001, 123, 5014; Y Liu, W Zhang, T J Pinnavaia, J Am Chem Soc, 2000, 122, 8791). A variation of those two techniques consists in initially preparing a mixture of aluminium and silicon precursors in the presence of two templates, one of which can generate a zeolitic system, the other of which can generate mesostructuration. This solution then undergoes two crystallization steps using variable hydrothermal treatment conditions, a first step which results in the formation of the mesoporous structure with an organized porosity and a second step which results in zeolitization of the amorphous walls (A Karlsson, M Stocker, R Schmidt, Micropor Mesopor Mater 1999, 27, 181). All of those synthesis methods suffer from the disadvantage of damaging the mesoporous structure and thus losing its advantages in the case in which growth of the zeolite seeds or wall zeolitization is not completely controlled, which renders such techniques difficult to carry out. It is possible to avoid that phenomenon by directly producing mesostructured/zeolite composites. This is achieved by heat treating a mixture of a solution of zeolite seeds and a solution of mesostructured aluminosilicate seeds (P Prokesova, S Mintova, J Cejka, T Bein, Micropor Mesopor Mater, 2003, 64, 165), or by growing a layer of zeolite on the surface of a pre-synthesized mesostructured aluminosilicate (D T On, S Kaliaguine, Angew Chem Int Ed, 2002, 41, 1036). From an experimental point of view, in contrast to the dip coating or aerosol techniques described above, the aluminosilicate materials with a hierarchical porosity as defined are not obtained by progressive concentration of inorganic precursors and template(s) in the solution in which they are present, but are obtained conventionally by direct precipitation in an aqueous solution or in polar solvents by adjusting the value of the critical micellar concentration of the template. Further, synthesis of such materials obtained by precipitation necessitates a maturation step in an autoclave since they may be found in the supernatant. The elementary particles normally obtained are not regular in shape and are generally characterized by a size that is generally between 200 and 500 nm, sometimes more.

SUMMARY OF THE INVENTION

The invention concerns a material with a hierarchical porosity, constituted by at least two spherical elementary particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 20 nm, said spherical elementary particles having a maximum diameter of 10 µm. Said matrix based on silicon oxide optionally further comprises at least one element X selected from the group constituted by aluminium, titanium, tungsten, zirconium, gallium, germanium, phosphorus, tin, antimony, lead, vanadium, iron, manganese, hafnium, niobium, tantalum and yttrium, preferably from the group constituted by aluminium, titanium, zirconium, niobium, germanium and gallium, more preferably aluminium. The present invention also concerns the preparation of the material of the invention. A first process for preparing the material of the invention comprises a) synthesis, in the presence of a template, of zeolitic nanocrystals with a maximum nanometric dimension of 300 nm to obtain a colloidal solution in which said nanocrystals are dispersed; b) mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and at least one colloidal solution obtained in accordance with a); c) aerosol atomization of said solution obtained in step b) to result in the formation of spherical droplets with a diameter of less than 200 µm; d) drying said droplets; and e) eliminating said template and said surfactant to obtain a material with a hierarchical porosity. A second process for preparing a material according to the invention comprises a') mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and zeolitic crystals dispersing into the form of nanocrystals with a maximum nanometric dimension of 300 nm in said solution; b') aerosol atomization of said solution obtained in step a') to result in the formation of spherical droplets with a diameter of less than 200 µm; c') drying said droplets; and d') eliminating at least said surfactant. The ordered structure of the matrix of the material of the invention is consecutive to the micellization or self-organization phenomenon by evaporation induced by the aerosol technique.

APPLICATION OF THE INVENTION

The material of the invention, which comprises a mesostructured inorganic matrix based on silicon oxide, with amorphous walls in which zeolitic nanocrystals are trapped, simultaneously presents the structural, textural and acid-basic properties of materials from the zeolite class and of materials based on silicon oxide, more precisely mesostructured aluminosilicate materials. Manufacture on the nanometric scale of a composite material based on mesostructured silicon/zeolites results in a fortuitous combination of microporous and mesoporous zones within the same spherical particle. Further, since the material of the invention is constituted by spherical elementary particles, the diameter of said particles is advantageously 50 nm to 10 µm and preferably 50 to 300 nm; the limited dimension of said particles and their homogeneous shape produces better diffusion of the reagents and reaction products during use of the material of the invention in potential industrial applications compared with known prior art materials in the form of elementary particles of non homogeneous shape, i.e. irregular, and with dimensions of much more than 500 nm. Further, the processes for preparation of the material of the invention consist of interacting, preferably in an acid medium, at least one surfactant, ionic or non ionic, with at least one silicic precursor, at least one optional precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, preferably selected from the group constituted by aluminium, titanium, zirconium, niobium, germanium and gallium, and more preferably aluminium, and either at least one colloidal solution in which zeolitic nanocrystals with a maximum nanometric dimension of 300 nm or zeolitic crystals dispersing into the form of nanocrystals with a maximum nanometric dimension of 300 nm in a solution, preferably acidic. Since the ordered structure of the material is consecutive to the micellization or self-organization phenomenon by evaporation induced by the aerosol technique, it can readily produce materials with a hierarchical porosity without damaging the nature of the mesostructured form or that of the zeolitic phase and allows operation with a wide range of zeolite nanocrystals regardless of their initial synthesis processes. In fact, zeolitic crystals with dimensions much greater than 300 nm can be used provided that they can disperse in solution, in particular in an acidic solution and more preferably in an hydro-organic acidic solution, in the form of nanocrystals with a maximum nanometric dimension of 300 nm. Further, compared with known syntheses for mesostructured aluminosilicates, production of the material of the invention is carried out continuously and the preparation time is reduced (a few hours as opposed to 12 to 24 hours by autoclaving).

The materials produced in accordance with the invention can be used conventionally in the processes disclosed in the references cited above, the disclosures of which are entirely incorporated by reference herein.

DISCLOSURE OF THE INVENTION

The present invention provides a material with a hierarchical porosity, constituted by at least two spherical elementary particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 20 nm, said spherical elementary particles having a maximum diameter of 10 μm.

The term "hierarchical porosity material" as used in the present invention means a material having a double porosity on the scale of each of said spherical particles: mesoporosity, i.e. a porosity organized on the mesopore scale, having a uniform dimension in the range 2.5 to 30 nm, preferably in the range 1.5 to 10 nm, distributed homogeneously and in a regular manner in each of said particles (mesostructuring), and a zeolitic type microporosity the characteristics of which (zeolite structure type, chemical composition of the zeolitic framework) are a function of the choice of zeolitic nanocrystals. The material of the invention also has an intraparticular textural macro porosity. It should be noted that porosity of a microporous nature may also result from insinuation of the surfactant used during preparation of the material of the invention, with the inorganic wall at the organic-inorganic interface developed during mesostructuring of the inorganic component of said material of the invention. In accordance with the invention, the zeolitic nanocrystals have a pore size in the range 0.2 to 2 nm, preferably in the range 0.2 to 1 nm and more preferably in the range 0.2 to 0.6 nm. Said nanocrystals generate the microporosity in each of the spherical elementary particles constituting the material of the invention.

The matrix based on silicon oxide included in each of the spherical particles constituting the material of the invention is mesostructured: it has mesopores having a uniform size in the range 1.5 to 30 nm and preferably in the range 1.5 to 10 nm, distributed homogeneously and regularly in each of said particles. The material located between the mesopores of each of said spherical particles is amorphous and forms walls the thickness of which is in the range 1 to 20 nm. The thickness of the walls corresponds to the distance separating one pore from another pore. The organization of the mesoporosity described above results in a structuration of the matrix based on silicon oxide, which may be hexagonal, vermicular or cubic, preferably vermicular.

In accordance with a particular implementation of the material of the invention, the matrix based on silicon oxide, which is mesostructured, is entirely silicic. In accordance with a further particular implementation of the material of the invention, the matrix based on silicon oxide, which is mesostructured, further comprises at least one element X selected from the group constituted by aluminium, titanium, tungsten, zirconium, gallium, germanium, phosphorus, tin, antimony, lead, vanadium, iron, manganese, hafnium, niobium, tantalum and yttrium, preferably from the group constituted by aluminium, titanium, zirconium, niobium, germanium and gallium, and more preferably aluminium. Preferably, the element X is aluminium: in this case the matrix of the material of the invention is an aluminosilicate. Said aluminosilicate has a Si/Al molar ratio of at least 1, preferably in the range 1 to 1000 and more preferably in the range 1 to 100.

According to the invention, the zeolitic nanocrystals advantageously represent 0.1% to 30% by weight, preferably 0.1% to 20% by weight and more preferably 0.1% to 10% by weight of the material of the invention. Any zeolite is possible; in particular but not exhaustively, those listed in the "Atlas of zeolite framework types", 5th revised Edition, 2001, Ch Baerlocher, W M Meier, D H Olson may be employed in the zeolitic nanocrystals present in each of the spherical elementary particles constituting the material of the invention. The zeolitic nanocrystals preferably comprise at least one zeolite selected from the following zeolites: ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1. More preferably, the zeolitic nanocrystals comprise at least one zeolite selected from zeolites with structure type MFI, BEA, FAU and LTA. Nanocrystals of different zeolites and in particular zeolites with different structure types may be present in each of the spherical particles constituting the material of the invention. In particular, each of the spherical particles constituting the material of the invention may advantageously comprise at least the first zeolitic nanocrystals the zeolite of which is selected from the following zeolites: ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from zeolites with structure type MFI, BEA, FAU and LTA, and at least second zeolitic nanocrystals the zeolite of which is different from that of the first zeolitic nanocrystals and is selected from the following zeolites: ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from zeolites with structure type MFI, BEA, FAU and LTA. Advantageously, the zeolitic nanocrystals comprise at least one zeolite which is either entirely silicic or, in addition to silicon, contains at least one element T selected from aluminium, iron, boron, indium and gallium, preferably aluminium.

In accordance with the invention, the diameter of said spherical elementary particles constituting the material of the invention is advantageously in the range 50 to 10 μm, preferably in the range 50 to 300 nm. More precisely, they are present in the material of the invention in the form of aggregates.

The material of the invention advantageously has a specific surface area in the range 100 to 1100 $m^2/g$, more advantageously in the range 400 to 800 $m^2/g$.

The present invention also concerns the preparation of the material of the invention. It proposes two processes for preparing the material of the invention. A first implementation of the process for preparing the material of the invention, hereinafter termed the "first preparation process of the invention" comprises: a) synthesis, in the presence of a template, of zeolitic nanocrystals with a maximum nanometric dimension of 300 nm to obtain a colloidal solution in which said nanocrystals are dispersed; b) mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and at least one colloidal solution obtained in accordance with a); c) aerosol atomization of said solution obtained in step b) to result in the formation of spherical droplets with a diameter of less than 200 μm; d) drying said droplets; and e) eliminating said template and said surfactant to obtain a material with a hierarchical porosity.

In accordance with step a) of the first preparation process of the invention, the zeolitic nanocrystals are synthesized using operating protocols which are known to the skilled person. In particular, the synthesis of beta zeolite nanocrystals has been described by T Bein et al, Micropor Mesopor Mater, 2003, 64, 165. The synthesis of Y zeolite nanocrystals has been described by T J Pinnavaia et al, J Am Chem Soc, 2000, 122, 8791. The synthesis of faujasite zeolite nanocrystals has been described by Kloetstra et al, Microporous Mater, 1996, 6, 287; the synthesis of ZSM-5 zeolite nanocrystals has been described by R Mokaya et al, J Mater Chem., 2004, 14, 863. The synthesis of silicalite nanocrystals (or of structure type MFI) has been described by R de Ruiter et al, Synthesis of Microporous Materials, Vol I, M L Occelli, H E Robson (eds), Van Nostrand Reinhold, New York, 1992, 167 and is given in Example 1 of the present application.

In general, zeolitic nanocrystals are synthesized by preparing a reaction mixture comprising at least one silicon source, optionally at least one source of at least one element T selected from aluminium, iron, boron, indium and gallium, preferably at least one source of aluminium, and at least one template. The reaction mixture is either aqueous or hydro-organic, for example a water-alcohol mixture. The reaction mixture is advantageously placed under hydrothermal conditions under autogenous pressure, optionally by adding a gas, for example nitrogen, at a temperature in the range 50° C. to 200° C., preferably in the range 60° C. to 170° C. and more preferably at a temperature which does not exceed 120° C. until the zeolitic nanocrystals are formed. At the end of said hydrothermal treatment, a colloidal solution is obtained in which the nanocrystals are in the dispersed state. The template may be ionic or neutral depending on the zeolite to be synthesized. It is normal to use templates from the following non exhaustive list: nitrogen-containing organic cations, elements from the alkalis (Cs, K, Na, etc), crown ethers, diamines and any other template which is well known to the skilled person.

In step b) of the first preparation process of the invention, element X is preferably selected from the group formed by aluminium, titanium, zirconium, niobium, germanium and gallium; more preferably, X is aluminium.

In a second implementation of the process for preparing the material of the invention, hereinafter termed the "second preparation process of the invention", zeolitic crystals are initially used which have the characteristic of dispersing in the form of nanocrystals with a maximum nanometric dimension of 300 nm in solution, for example in acidic hydro-organic solution. The second preparation process of the invention comprises a') mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and zeolitic crystals dispersing into the form of nanocrystals with a maximum nanometric dimension of 300 nm in said solution; b') aerosol atomization of said solution obtained in step a') to result in the formation of spherical droplets with a diameter of less than 200 µm; c') drying said droplets; and d') eliminating at least said surfactant.

In step a') of the second preparation process of the invention, zeolitic crystals are used. Any crystalline zeolite which is known in the art and which has the property of dispersing in solution, for example in acidic hydro-organic solution, in the form of nanocrystals with a maximum nanometric dimension of 300 nm. is suitable for carrying out step a'). Said zeolitic crystals are synthesized using methods which are known to the skilled person. The zeolitic crystals used in step a') may already be in the form of nanocrystals. Zeolitic crystals with a dimension of more than 300 nm, for example in the range 300 nm to 200 µm can also advantageously be used if they disperse in solution, for example in hydro-organic solution, preferably in acidic hydro-organic solution, in the form of nanocrystals with a maximum nanometric dimension of 300 nm. Zeolitic crystals dispersing in the form of nanocrystals with a maximum nanometric dimension of 300 nm can also be obtained by functionalization of the nanocrystal surface. The element X is preferably selected from the group constituted by aluminium, titanium, zirconium, niobium, germanium and gallium; more preferably, X is aluminium. The zeolitic crystals used are either in their as synthesized form, i.e. still containing template, or in their calcined form, i.e. free of said template. When the zeolitic crystals used are in their as synthesized form, said template is eliminated during step d') of the second preparation process of the invention.

According to the two processes for preparing the material of the invention, the silicic precursor and optional precursor for at least one element X, preferably the aluminium precursor, used in step b) of the first preparation process of the invention, are precursors of inorganic oxides which are well known to the skilled person. The silicic precursor is obtained from any source of silicon and advantageously from a sodium silicate precursor with formula $SiO_2$, NaOH, from a chlorine-containing precursor with formula $SiCl_4$, from an organometallic precursor with formula $Si(OR)_4$ in which R=H, methyl, ethyl or from a chloroalkoxide precursor with formula $Si(OR)_{4-x}Cl_x$ in which R=H, methyl, ethyl, x being in the range 0 to 4. The silicic precursor may also advantageously be an organometallic precursor with formula $Si(OR)_{4-x}R'_x$ in which R=H, methyl, ethyl and R' is an alkyl chain or a functionalized alkyl chain, for example a thiol, amino, β diketone or sulphonic acid group, x being in the range 0 to 4. the precursor for element X may be any compound comprising the element X which can liberate said element in solution, for example in hydro-organic solution, preferably in acidic hydro-organic solution, in the reactive form. In the preferred case in which X is aluminium, the aluminium precursor is advantageously an inorganic aluminium salt with formula $AlZ_3$, Z being a halogen or the $NO_3$ group. Preferably, Z is chlorine. The aluminium precursor may also be an organometallic precursor with formula $Al(OR'')_3$ in which R''=ethyl, isopropyl, b-butyl, s-butyl or t-butyl or a chelated precursor such as aluminium acetylacetonate ($Al(CH_7O_2)_3$). The aluminium precursor may also be an aluminium oxide or hydroxide.

The surfactant used to prepare the mixture of step b) of the first preparation process of the invention or step a') of the second preparation process of the invention is an ionic or non ionic surfactant or a mixture of the two. Preferably, the ionic surfactant is selected from phosphonium or ammonium ions, and more preferably from quaternary ammonium salts such as cetyltrimethyl ammonium bromide (CTAB). Preferably, the non ionic surfactant may be any copolymer having at least two portions with different polarities endowing them with amphiphilic macromolecular properties. Said copolymers may be included in the following non exhaustive list of copolymer classes: fluorinated copolymers (—[$CH_2$—$CH_2$—$CH_2$—$CH_2O$—CO—R1- in which $R1=C_4F_9$, $C_8F_{17}$, etc), biological copolymers such as poly amino acids (polylysine, alginates, etc), dendrimers, block copolymers constituted by chains of poly(alkylene oxide) and any other copolymer with an amphiphilic nature which is known to the skilled person (S Forster, M Antionnetti, Adv Mater, 1998, 10, 195-217, S Forster, T Plantenberg, Angew Chem Int Ed, 2002, 41, 688-714, H Colfen, Macromol Rapid Commun, 2001, 22, 219-252).

Preferably, in the context of the present invention, a block copolymer constituted by poly (alkylene oxide) chains is used. Said block copolymer is preferably a block copolymer having two, three of four blocks, each block being constituted by one poly(alkylene oxide) chain. For a two-block copolymer, one of the blocks is constituted by a poly(alkylene oxide) chain which is hydrophilic in nature and the other block is constituted by a poly(alkylene oxide) chain which is hydrophobic in nature. For a three-block copolymer, two of the blocks are constituted by a poly(alkylene oxide) chain which is hydrophilic in nature while the other block, located between two blocks with hydrophilic portions, is constituted by a poly(alkylene oxide) chain which is hydrophobic in nature. Preferably, in the case of a three-block copolymer, the chains of poly(alkylene oxide) of hydrophilic nature are chains of poly(ethylene oxide), $(PEO)_x$ and $(PEO)_z$, and the poly(alkylene oxide) chains which are hydrophobic in nature are chains of poly (propylene oxide), $(PPO)_y$, chains of poly (butylene oxide) or mixed chains, each chain of which is a mixture of several alkylene oxide monomers. More preferably, in the case of a three-block copolymer, a compound with formula $(PEO)_x(PPO)_y(PEO)_z$ is used in which x is in the range 5 to 106, y is in the range 33 to 70 and z is in the range 5 to 106. Preferably, the values of x and z are identical. Highly advantageously, a compound in which x=20, y=70 and z=20 (P123) is used and a compound in which x=106, y=70 and z=106 (F127) is used. Commercially available non ionic surfactants known as Pluronic (BASF), Tetronic (BASF), Triton (Sigma), Tergitol (UnionCarbide), Brij (Aldrich) can be used as non ionic surfactants in step b) of the first preparation process of the invention or in step a') of the second process of the invention. For a four-block copolymer, two of the blocks are constituted by a poly(alkylene oxide) chain which is hydrophilic in nature and the two other blocks are constituted by a poly(alkylene oxide) chain which is hydrophobic in nature.

The solution into which the following are mixed: at least one silicic precursor, optionally at least one precursor of at least one element X, preferably an aluminium precursor, at least one surfactant and, in the case of step b) of the first preparation process of the invention, the colloidal solution in which said synthesized zeolitic nanocrystals are dispersed, or in the case of step a') of the second preparation process of the invention, zeolitic crystals are dispersed in said solution in the form of nanocrystals with a maximum nanometric dimension of 300 nm; may be acidic, neutral or basic. Preferably, said solution is acidic and has a maximum pH of 2, more preferably in the range 0 to 2. Non limiting examples of acids used to obtain an acidic solution with a maximum pH of 2 are hydrochloric acid, sulphuric acid and nitric acid. Said solution may be aqueous or it may be a water-organic solvent mixture, the organic solvent preferably being a polar solvent, in particular an alcohol, preferably ethanol. Said solution may also be practically organic, preferably practically alcoholic, the quantity of water being such that hydrolysis of the inorganic precursors is ensured (stoichiometric quantity). More preferably, said solution in which the following are mixed: at least one silicic precursor, optionally at least one precursor of at least one element X, preferably an aluminium precursor, at least one surfactant and, in the case of step b) of the preparation process of the invention, the colloidal solution in which said synthesized zeolitic nanocrystals are dispersed, or in the case of step a') of the second preparation process of the invention the zeolitic crystals are dispersed in said solution in the form of nanocrystals with a maximum nanometric dimension of 300 nm, is a hydro-organic acid mixture, more preferably an acidic water-alcohol mixture.

In the preferred case in which the matrix of the material of the invention contains aluminium, the concentrations of silicic and aluminium precursors in step b) of the first preparation process of the invention or in step a') of the second preparation process of the invention are defined by the molar ratio Si/Al, this being at least equal to 1, preferably in the range 1 to 1000, and more preferably in the range 1 to 100. The quantity of zeolitic nanocrystals dispersed in the colloidal solution introduced during step b) of the first preparation process of the invention, or that of the zeolitic crystals introduced during step a') of the second preparation process of the invention is such that the zeolitic nanocrystals advantageously represent 0.1% to 30% by weight, preferably 0.1% to 20% by weight and more preferably 0.1% to 10% by weight of the material of the invention.

The initial concentration of surfactant introduced into the mixture of step b) of the first preparation process of the invention or step a') of the second preparation process of the invention is defined by $c_0$ which is defined with respect to the critical micellar concentration $(c_{mc})$ which is well known to the skilled person. The $c_{mc}$ is the limiting concentration beyond which self-arrangement of the molecules of surfactant in the solution occurs. The concentration $c_0$ may be less than, equal to or more than $c_{mc}$, preferably less than $c_{mc}$. In a preferred implementation of one or the other of the processes of the invention, the concentration $c_0$ is less than the $c_{mc}$ and said solution in step b) of the first preparation process of the invention or in step a') of the second preparation process of the invention is an acidic water-alcohol acidic mixture.

The step for atomizing a mixture in step c) of the first preparation process of the invention or in step b') of the second preparation process of the invention produces spherical droplets with a diameter which is preferably in the range 2 to 200 μm. The size distribution of said droplets is of the log normal type. The aerosol generator used is a commercial model 3078 apparatus supplied by TSI. The solution is atomized into a chamber into which a vector gas is sent, an $O_2/N_2$ mixture (dry air), at a pressure P of 1.5 bars. In step d) of the first preparation process of the invention, or in step c') of the second preparation process of the invention, said droplets are dried. Drying is carried out by transporting said droplets via the vector gas, the $O_2/N_2$ mixture, in glass tubes, which results in progressive evaporation of the solution, for example of the hydro-organic acid solution, and the production of spherical elementary particles. Drying is completed by passing said particles into an oven the temperature of which can be adjusted, usually between temperatures of 50° C. to 600° C. and preferably 80° C. to 400° C., the residence time for said particles in the oven being of the order of 3 to 4 seconds. The particles are then harvested in a filter and constitute the material of the invention. A pump placed at the end of the circuit routes the species into the experimental aerosol device.

In the case in which the solution in step b) of the first preparation process of the invention or step a') of the second preparation process of the invention is a water-organic solvent mixture, preferably acidic, it is essential during step b) of the preparation process of the invention or step a') of the second preparation process of the invention that the concentration of surfactant at the start of mesostructuring of the matrix is less than the critical micellar concentration so that evaporation of said hydro-organic solution, preferably acidic, during step c) of the first preparation process of the invention or step b') of the second preparation process of the invention using the aerosol technique induces a phenomenon of micellization or self-organization leading to mesostructuring of the matrix of material of the invention around the zeolitic nanocrystals which remain unchanged in form and size during steps c) and d) of the first preparation process of the invention or b') and c') of the second preparation process of the invention. When $c_0<c_{mc}$, mesostructuring of the matrix of the material of the invention prepared using one of the processes described above follows progressive concentration of the silicic precursor in each droplet, of the optional precursor for element X, preferably an aluminium precursor, and of the surfactant, until a concentration of surfactant $c > c_{mc}$ results from evaporation of the hydro-organic solution, preferably acidic.

In general, increasing the joint concentration of the silicic precursor and possibly of the precursor for element X, preferably an aluminium precursor, and the surfactant causes precipitation of the silicic precursor and of the optional precursor for element X, preferably the aluminium precursor, around the self-organized surfactant and as a consequence, structuration of the matrix of the material of the invention. The inorganic/inorganic phase, organic/organic phase and organic/inorganic phase interactions result in a self-organization mechanism which is cooperative with hydrolysis/condensation of the silicic precursor and optional precursor for the element X, preferably an aluminium precursor, around the surfactant. During said self-organizing phenomenon, the zeolitic nanocrystals are trapped in the matrix based on silicon oxide, mesostructured, comprised in each of the spherical elementary particles constituting the material of the invention. The aerosol technique is particularly advantageous for carrying out step c) of the first preparation process of the invention or step b') of the second preparation process of the invention to constrain the reagents present in the initial solution to interact together, with no possible loss of material apart from the solvents, i.e. the solution, preferably the aqueous solution, preferably acidic, and optionally supplemented with a polar solvent, the totality of the silicon, optional element X, and the zeolitic nanocrystals initially present then being perfectly preserved throughout each of the processes of the invention instead of potentially being eliminated during the filtering steps and washes encountered in conventional synthesis processes known to the skilled person. Drying the droplets in step d) of the first preparation process of the invention or in step c') of the second preparation process of the invention is advantageously followed by passage through an oven at a temperature in the range 50° C. to 150° C. Elimination of the template and the surfactant in step e) of the first preparation process of the invention or elimination of at least the surfactant in step d') of the second preparation process of the invention to obtain the material of the invention with a hierarchical porosity is advantageously carried out by chemical extraction or heat treatment and preferably by calcining in air within a temperature range of 300° C. to 1000° C. and more precisely in a range of 500° C. to 600° C. for a period of 1 to 24 hours and preferably for a period of 2 to 6 hours.

The material with a hierarchical porosity of the present invention may be obtained in the form of powder, beads, pellets, granules or extrudates, the forming operations being carried out using conventional techniques which are known to the skilled person. Preferably, the material with a hierarchical porosity of the invention is obtained in the form of a powder which is constituted by spherical elementary particles having a maximum diameter of 10 μm, which facilitates any diffusion of the reagents in the case of the use of a material of the invention in a potential industrial application.

The material of the invention with a hierarchical porosity is characterized using several analytical techniques and in particular by small angle X ray diffraction (small angle XRD), large angle X ray diffraction (XRD), the nitrogen adsorption isotherm, transmission electron microscopy (TEM) and X ray fluorescence elementary analysis.

Large angle X ray diffraction (2θ in the range 5° to 70) can be used to characterize a crystalline solid defined by repetition of a unit cell on the molecular scale. In the discussion below, X ray analysis is carried out on a powder using a diffractometer operating in reflection equipped with a back monochromator using the copper radiation line (wavelength 1.5406 Å). The peaks normally observed on diffractograms corresponding to a given value for the angle 2θ are associated with the interplanar spacings $d_{hkl}$ which are characteristic of the structural symmetry of the material, (hkl being the Miller indices of the reciprocal lattice) by the Bragg relationship: $2d_{hkl}*\sin(\theta) = n*\lambda$. This indexation allows the lattice parameters (a, b, c) of the framework to be determined directly. Thus, large angle XRD analysis is adapted to structural characterization of zeolitic nanocrystals present in each of the spherical elementary particles constituting the material of the invention. In particular, it provides access to the pore dimensions of the zeolitic nanocrystals. Using the same principle, the small angle X ray diffraction technique (values for angle 2θ in the range 0.5° and 3°) can characterize the periodicity on a nanocrystal scale generated by the organized mesoporosity of the mesostructured matrix based on silicon oxide of the material of the invention. The value of the lattice parameters (a, b, c) is a function of the hexagonal, cubic or vermicular structure obtained. As an example, the large or small angle X ray diffractograms of a material with a hierarchical porosity obtained using one of the processes of the invention constituted by zeolite nanocrystals of type ZSM-5 (MFI) zeolite show the mesostructured matrix as being purely silicic and obtained using a particular block copolymer, poly(ethylene oxide)$_{106}$-poly(propylene oxide)$_{70}$-poly(ethylene oxide)$_{106}$ (PEO$_{106}$—PPO$_{70}$—PEO$_{106}$ or F127) respectively have the diffractogram associated with the Pnma (n° 62) symmetry group of ZSM-5 zeolite at large angles and a correlation peak which is perfectly resolved at small angles associated with the vermicular structure of the mesostructured matrix which corresponds to a correlation distance d between pores. The angle obtained on the XRD diffractogram allows the correlation distance d to be deduced using Bragg's law: $2d*\sin(\theta) = n*\lambda$.

The values for the lattice parameters a, b, c obtained for the characterization of zeolite nanocrystals agree with the values obtained for a ZSM-5 type zeolite (MFI) which is well known to the skilled person ("Collection of simulated XRD powder patterns for zeolites", 4$^{th}$ edition, 2001, M M J Treacy, J B Higgins).

Nitrogen adsorption isothermal analysis corresponding to the physical adsorption of nitrogen molecules in the pores of the material on progressively increasing the pressure at constant temperature provides information regarding the textural characteristics (pore diameter, porosity type, specific surface area) which are peculiar to the material of the invention. In particular, it provides access to the specific surface area and to the mesoporous distribution of the material. The term "specific surface area" means the BET specific surface area ($S_{BET}$ in m$^2$/g) determined by nitrogen adsorption in accordance with American standard ASTM D 3663-78 established using the BRUNAUER-EMMETT-TELLER method described in the periodical "The Journal of the American Society", 60, 309, (1938). The pore distribution representative of a population of mesopores centered in a range of 1.5 to 50 nm is determined using the Barrett-Joyner-Halenda (BJH) model. The nitrogen adsorption-desorption isotherm using the BJH model is described in the periodical "The Journal of the American Society", 73, 373 (1951) written by E P Barrett, L G Joyner and P P Halenda. In the description below, the mesopore diameter φ in a given mesostructured matrix corresponds to the mean diameter for nitrogen desorption defined as a diameter such that all pores with less than that diameter constitute 50% of the pore volume (Vp) measured on the desorption arm of the nitrogen isotherm. Further, the shape of the nitrogen adsorption isotherm and the hysteresis loop provides information regarding the presence of microporosity linked to zeolitic nanocrystals and to the nature of the mesoporosity. As an example, the nitrogen adsorption isotherm of a material with a hierarchical porosity obtained using one or other of the processes of the invention constituted by zeolite nanocrystals of the ZSM-5 type (MFI), the mesostructured matrix being purely silicic and obtained using a particular block copolymer, poly(ethylene oxide)$_{106}$-poly(propylene oxide)$_{70}$-poly(ethylene oxide)$_{106}$(PEO$_{106}$—PPO$_{70}$—PEO$_{106}$ or F127) has, for low values of P/Po (in which Po is the saturated vapour pressure at temperature T), a type I isotherm characteristic of a microporous material, and for higher values of P/Po, a type IV isotherm and a type H1 hysteresis loop, the associated pore distribution curve being representative of a population of mesopores with a uniform size centered in a range of 1.5 to 50 nm. Regarding the mesostructured matrix, the difference between the value for the pore diameter $\phi$ and the correlation distance between pores d defined by small angle XRD as described above provides access to the dimension e in which e=d−$\phi$ and is characteristic of the thickness of the amorphous walls of the mesostructured matrix of the invention.

Transmission electron microscope analysis (TEM) is a technique which is also widely used to characterize the mesostructured matrix of the material of the invention. This allows the formation of an image of the solid being studied, the contrasts observed being characteristic of the structural organization, texture or morphology of the zeolite/mesostructure composition of the particles observed, the resolution reaching a maximum of 0.2 nm. In the description below, TEM images were produced from microtomed sections of the sample to visualize a section of a spherical elementary particle of the material of the invention. As an example, TEM images obtained for an aluminosilicate material with a hierarchical porosity obtained using one or other of the processes of the invention constituted by type ZSM-5 zeolite nanocrystals (MFI), the mesostructured matrix being purely silicic and obtained using a particular block copolymer, F127, had a vermicular mesostructure within the same spherical particle (the material being defined by the dark zones) within which can be seen substantially spherical opaque objects representing the zeolitic nanocrystals trapped in the mesostructured matrix. Analysis of the image also provides access to the parameters d, $\phi$ and e, characteristic of the mesostructured matrix defined above. It is also possible to visualize on the same record the lattice planes of the nanocrystals instead of the opaque objects mentioned above and thus to deduce the structure of the zeolite.

The morphology and dimensional distribution of the elementary particles were established from analysis of the images obtained by SEM (scanning electron microscopy).

The structure of the mesostructured material of the invention may be of the vermicular, cubic or hexagonal type depending on the nature of the surfactant selected as the template.

The invention will now be illustrated by the following examples.

EXAMPLES

In the examples below, the aerosol technique used was that described above in the description of the invention.

Example 1 (Invention)

Preparation of Material with a Hierarchical Porosity Constituted by Zeolite Nanocrystals of the Silicalite Type (MFI) in an Amount of 3.7% of the Final Material Weight and a Purely Silicic Mesostructured Matrix 6.0 g of TEOS (tetraethylorthosilicate) was hydrolyzed in 10.4 ml of tetrapropyl ammonium hydroxide (TPAOH, 20%). 1.5 ml of water was then added and the solution was stirred to obtain a clear solution. The solution was autoclaved at T=80° C. for 4 days. Once synthesis was complete, the crystals were recovered by centrifuging (20000 rpm for one hour), re-dispersed in water (ultrasound) then re-centrifuged until the solution after re-dispersion had a pH of close to 7. The pH of the colloidal suspension of silicalite-1 nanocrystals was then adjusted to 9.5 by adding a 0.1% ammoniacal solution. The mean silicalite crystal size was 100 nm. 400 μl of said solution was then added to a solution containing 30 g of ethanol, 15 ml of water, 4.5 g of TEOS, 0.036 ml of HCl and 1.4 g of F127 surfactant. The pH of the solution was adjusted to 2. The ensemble was sent to the atomization chamber of an aerosol generator as described above and the solution was atomized in the form of fine droplets under the action of the vector gas (dry air) introduced under pressure (P=1.5 bars). The droplets were dried using the protocol described in the invention described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by silicalite zeolite nanocrystals trapped in a purely silicic matrix with an organized mesoporosity characterized by a vermicular structure. The nitrogen adsorption isothermal analysis produced a specific surface area in the final material of $S_{BET}$=480 m$^2$/g and a mesopore diameter characteristic of the purely silicic mesostructured matrix of $\phi$=6.2 nm. Large angle XRD produced a diffractogram characteristic of silicalite zeolite (micropore dimension, measured by XRD, of the order of 0.55 nm). Small angle XRD showed a correlation peak associated with a vermicular organization of the mesostructured matrix. The Bragg relationship, 2d*sin(0.3)=1.5406, gave d=15 nm. The thickness of the amorphous walls of the purely silicic mesostructured matrix defined by e=d−$\phi$ was thus e=9 nm. A SEM image of the spherical elementary particles obtained indicated that the particle size was characterized by a diameter of 50 to 700 nm, with a particle size distribution being centred around 300 nm.

Example 2 (Invention)

Figure 1:
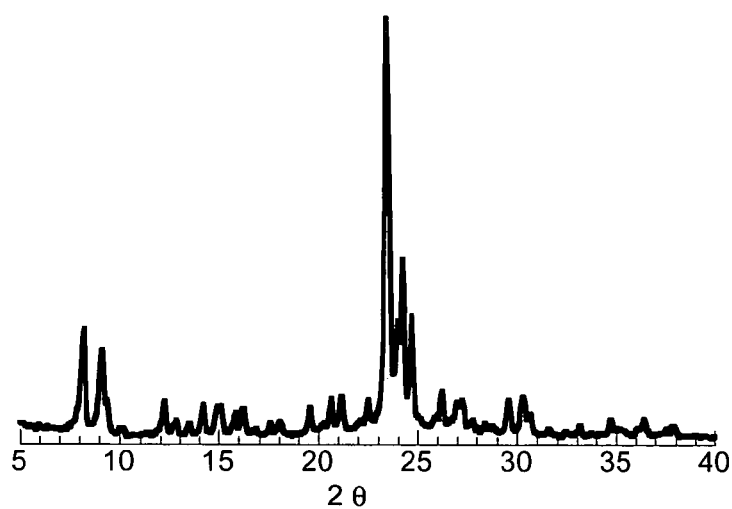
FIG. 1 represents a diffractogram of ZSM-5.
Figure 2:
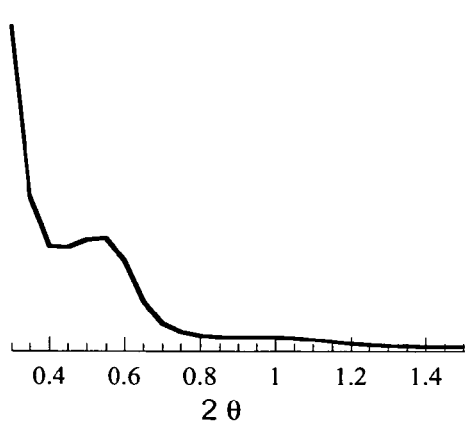
FIG. 2 represents a small angle XRD of a material of the invention.
Figure 3:
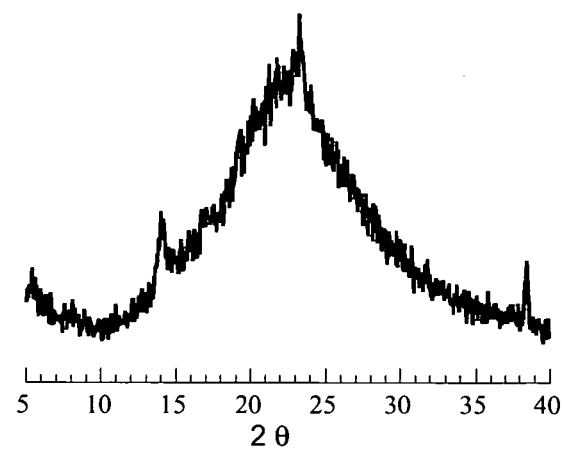
FIG. 3 represents a large angle XRD of a material of the invention.
Figure 4:
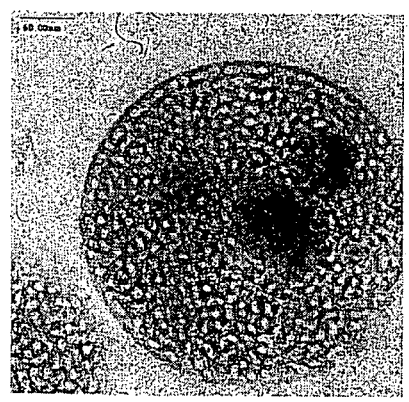
FIG. 4 represents a TEM analysis of a material of the invention.

Preparation of Material with a Hierarchical Porosity Constituted by Zeolite Nanocrystals of the ZSM-5 Type (MFI) in an Amount of 3.7% of the Final Material Weight and a Purely Silicic Mesostructured Matrix 0.14 g of aluminium sec-butoxide was added to a solution containing 7 g of tetrapropyl ammonium hydroxide solution (TPAOH, 20%), 4.3 ml of water and 0.0092 g of sodium hydroxide. 6 g of TEOS (tetraethylorthosilicate) was then added to this solution which was stirred at ambient temperature to obtain a clear solution. The solution was placed in an oven at T=95° C. for 18 hours. A milky white colloidal suspension was obtained containing ZSM-5 zeolite nanocrystals with a mean dimension of 130 nm. FIG. 1 shows a diffractogram of ZSM-5 nanocrystals. 400 µl of said solution was then added to a solution containing 30 g of ethanol, 15 ml of water, 4.5 g of TEOS, 0.036 ml of HCl and 1.4 g of F127 surfactant. The pH of the solution was adjusted to 2 with HCl. The ensemble was sent to the atomization chamber of an aerosol generator as described above and the solution was atomized in the form of fine droplets under the action of the vector gas (dry air) introduced under pressure (P=1.5 bars) as described above. The droplets were dried using the protocol described in the invention described above. The temperature of the drying oven was fixed at 350° C. The harvested powder was then calcined in air for 5 h at T=550° C. The solid was characterized by small angle (FIG. 2) and large angle (FIG. 3) XRD, by the nitrogen adsorption isotherm, by TEM and by X ray fluorescence. TEM analysis (FIG. 4) showed that the final material was constituted by nanocrystals of ZSM-5 zeolite trapped in a purely silicic matrix with an organized mesoporosity characterized by a vermicular structure. The nitrogen adsorption isothermal analysis produced a specific surface area in the final material of $S_{BET}$=480 m$^2$/g and a mesopore diameter characteristic of the purely silicic mesostructured matrix of $\phi$=6.2 nm. Large angle XRD produced a diffractogram characteristic of ZSM-5 zeolite (micropore dimension, measured by XRD, of the order of 0.55 nm). Small angle XRD showed a correlation peak associated with a vermicular organization of the mesostructured matrix. The Bragg relationship, 2d*sin(0.3)=1.5406, gave d=15 nm. The thickness of the amorphous walls of the purely silicic mesostructured matrix defined by e=d–$\phi$ was thus e=9 nm. A SEM image of the spherical elementary particles obtained indicated that the particle size was characterized by a diameter of 50 to 700 nm, with a particle size distribution being centred around 300 nm.

Example 3 (Invention)

Preparation of an Aluminosilicate Material with a Hierarchical Porosity Constituted by Zeolite Nanocrystals of the ZSM-5 Type (MFI) (Si/Al=50) in an Amount of 10% of the Final Material Weight and a Aluminosilicate Mesostructured Matrix (Si/Al=4)

Figure 5:
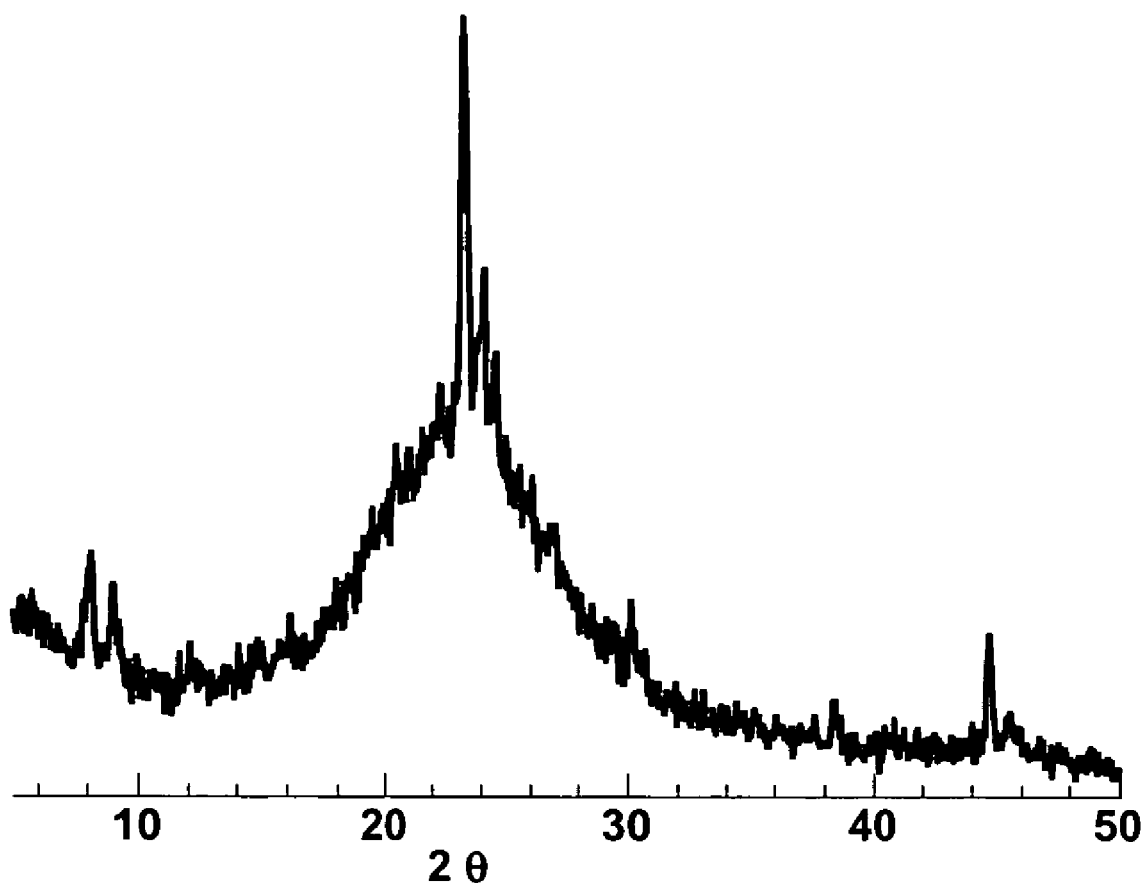
FIG. 5 represents small and large angle XRD of a material of the invention.

0.14 g of aluminium tri-sec-butoxide was added to a solution containing 3.5 ml of TPAOH, 0.01 g of sodium hydroxide NaOH and 4.3 ml of water. After dissolving the aluminium alkoxide, 6 g of TEOS (tetraethylorthosilicate) was added. The solution was stirred at ambient temperature for 5 hours and autoclaved at T=95° C. for 12 h. The white solution obtained contained 135 nm ZSM-5 nanocrystals. The solution was centrifuged at 20000 rpm for 30 minutes. The solid was redispersed in water then centrifuged again at 20000 rpm for 30 minutes. This washing was carried out twice. The nanocrystals formed a gel which was oven dried overnight at 60° C. 0.461 g of these crystals was redispersed in a solution containing 30 g of ethanol, 15 ml of water, 3.59 g of TEOS, 1.03 g of AlCl$_3$.6H$_2$O, 0.036 ml of HCl and 1.4 g of P123 surfactant by ultrasound agitation for 24 hours. The ensemble was sent to the atomization chamber of an aerosol generator as described above and the solution was atomized in the form of fine droplets under the action of the vector gas (dry air) introduced under pressure (P=1.5 bars) using the method described above. The droplets were dried using the protocol described in the invention described above. The temperature of the drying oven was fixed at 350° C. The harvested powder was then calcined in air for 5 h at T=550° C. The solid was characterized by small angle and large angle (FIG. 5) XRD, by the nitrogen adsorption isotherm, by TEM and by X ray fluorescence. TEM analysis showed that the final material was constituted by nanocrystals of ZSM-5 zeolite trapped in a purely silicic matrix with an organized mesoporosity characterized by a vermicular structure. The nitrogen adsorption isothermal analysis produced a specific surface area in the final material of $S_{BET}$=478 m$^2$/g and a mesopore diameter characteristic of the mesostructured aluminosilicate matrix of $\phi$=4 nm. Large angle XRD produced a diffractogram characteristic of ZSM-5 zeolite (micropore dimension of the order of 0.55 nm). Small angle XRD showed a correlation peak associated with a vermicular organization of the mesostructured matrix. The Bragg relationship, 2d*sin(0.4)=1.5406, gave d=11 nm. The thickness of the amorphous walls of the aluninosilicate mesostructured matrix defined by e=d–$\phi$ was thus e=7 nm. A SEM image of the spherical elementary particles obtained indicated that the particle size was characterized by a diameter of 50 to 700 nm, with a particle size distribution being centred around 300 nm.

Example 4 (Invention)

Preparation of an Aluminosilicate Material with a Hierarchical Porosity Constituted by Type A Zeolite Nanocrystals (LTA) (Si/Al=6) in an Amount of 3.7% of the Final Material Weight and a Purely Silicic Mesostructured Matrix 2.19 g of aluminium isopropoxide was added to a solution containing 3.5 ml of tetramethyl ammonium hydroxide (TMAOH), 0.01 g of sodium hydroxide NaOH and 28 ml of water. After dissolving the aluminium alkoxide, 6 g of TEOS (tetraethylorthosilicate) was added. The solution was stirred at ambient temperature for 5 hours and autoclaved at T=95° C. for 12 h. The white solution obtained contained 140 nm LTA nanocrystals. 400 µl of this solution was then added to a solution containing 30 g of ethanol, 15 ml of water, 4.5 g of TEOS, 0.036 ml of HCl and 1.4 g of F127 surfactant. The pH of the solution was adjusted to 2. The ensemble was sent to the atomization chamber of an aerosol generator and the solution was atomized in the form of fine droplets under the action of the vector gas (dry air) introduced under pressure (P=1.5 bars) using the method described above. The droplets were dried using the protocol described in the invention described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by nanocrystals of type A zeolite trapped in a purely silicic matrix with an organized mesoporosity characterized by a vermicular structure. The nitrogen adsorption isothermal analysis produced a specific surface area in the final material of $S_{BET}$=478 m$^2$/g and a mesopore diameter characteristic of the purely silicic mesostructured matrix of $\phi$=6 nm. Large angle XRD produced a diffractogram characteristic of LTA zeolite. Small angle XRD showed a correlation peak associated with a vermicular organization of the porosity. The Bragg relationship, 2d*sin(0.3)=1.5406, gave d=15 nm. The thickness of the amorphous walls of the purely silicic mesostructured matrix defined by e=d−φ was thus e=9 nm. A SEM image of the spherical elementary particles obtained indicated that the particle size was characterized by a diameter of 50 to 700 nm, with a particle size distribution being centred around 300 nm.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure of all applications, patents and publications, cited herein and of corresponding French application No. 0406940, filed Jun. 24, 2004 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A material with a hierarchical porosity, constituted by at least two spherical elementary particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 20 nm, said spherical elementary particles having a maximum diameter of 10 μm.

2. A material according to claim 1, in which said zeolitic nanocrystals have a pore dimension in the range 0.2 to 0.6 nm.

3. A material according to claim 1, in which the pore size of said mesostructured matrix is in the range 1.5 to 10 nm.

4. A material according to claim 1, in which said mesostructured matrix has a hexagonal, cubic or vermicular structure.

5. A material according to claim 1, in which said matrix based on silicon oxide is entirely silicic.

6. A material according to claim 1, in which said matrix based on silicon oxide comprises at least one element X selected from the group constituted by aluminium, titanium, zirconium, gallium, germanium and niobium.

7. A material according to claim 6, in which the element X is aluminium.

8. A material according to claim 7, in which said matrix has a Si/Al ratio of at least 1.

9. A material according to claim 1, in which the zeolitic nanocrystals comprise at least one zeolite selected from zeolites with structure type MFI, BEA, FAU and LTA.

10. A material according to claim 1, in which said zeolitic nanocrystals comprise at least one entirely silicic zeolite.

11. A material according to claim 1, in which said zeolitic nanocrystals comprise at least one zeolite containing silicon and aluminium.

12. A material according to claim 1, with a specific surface area in the range 100 to 1100 $m^2/g$.

13. A process for preparing a material according to claim 1, comprising a) synthesis, in the presence of a template, of zeolitic nanocrystals with a maximum nanometric dimension of 300 nm to obtain a colloidal solution in which said nanocrystals are dispersed; b) mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and at least one colloidal solution obtained in accordance with a); c) aerosol atomization of said solution obtained in step b) to result in the formation of spherical droplets with a diameter of less than 200 μm; d) drying said droplets; and e) eliminating said template and said surfactant to obtain a material with a hierarchical porosity.

14. A process for preparing a material according to claim 1, comprising a') mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and zeolitic crystals dispersing into the form of nanocrystals with a maximum nanometric dimension of 300 nm in said solution; b') aerosol atomization of said solution obtained in step a') to result in the formation of spherical droplets with a diameter of less than 200 μm; c') drying said droplets; and d') eliminating at least said surfactant.

15. A process according to claim 13, in which the element X is aluminium.

16. A process according to claim 13, in which said surfactant is a three block copolymer, each block being constituted by a poly(alkylene oxide) chain.

17. A process according to claim 16, in which said three-block copolymer is constituted by two chains of poly(ethylene oxide) and one chain of poly(propylene oxide).

* * * * *